Figure 3:
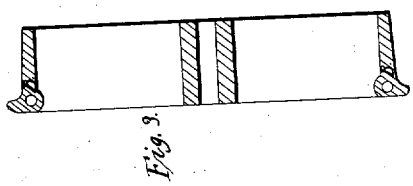
Figure 4:
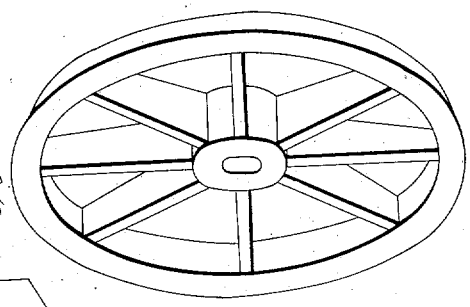
Figure 1:
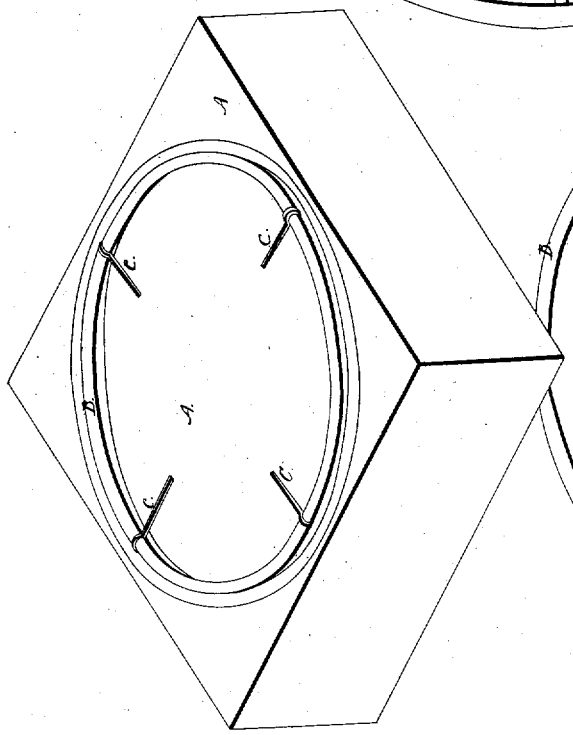
Figure 2:
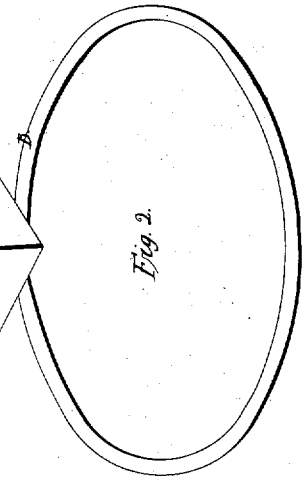

8332X

P. Davis,

Casting Car Wheels.

Patented July 29, 1834.

July 29. 1834

Phineas Davis Baltimore Md.

Letters Patent July 29. 1834.

The schedule referred to in these Letters Patent and making part of the same containing a description in the words of the said Phineas Davis himself of his improvement in the mode of Chilling cast iron wheels for Rail Road Cars and Carriages.-

Whereas it has been found that in the casting of what are called Chilled wheels for railroad Cars that the part of the wheel which is most liable to wear namely the rise Cone or Curve between the tread of the wheel and the flanch, is usually less hard than the other parts for the obvious reason that the metal there is less rapidly cooled by the chill: Now be it known that I Phineas Davis of the City of Baltimore in the State of Maryland have invented a new and improved mode of Chilling such wheels in which by the Cooling influence of a hoop or ring of wrought iron made and placed in the flask or mould at the time of Casting in a way to be presently set forth I have succeeded in removing this difficulty and I do hereby declare that the following is a full and exact description thereof.

Those acquainted with the business of Casting iron are aware that the operation of Chilling consists in placing within the mould, so as to make a part thereof a piece or pieces of iron which when the metal is poured in rapidly cools that portion with which it is in contact and renders it hard In the Casting of wheels for rail road Cars, the Chill consists of an iron hoop of Considerable thickness and with which the whole face of the wheel including its flanch and tread is in Contact but from its form as I have already indicated there is one part of it uniting the tread with the flanch which is less rapidly cooled than the others. To remove this difficulty I employ what may be denominated an internal Chill: this Consists of an iron hoop or ring which I usually form of round rods half an inch in diameter giving to the hoop or ring such a diameter as shall Cause it when laid in the flask and the casting made to be surrounded ly and completely imbedded within the cast metal and to stand about
half an inch within the body of that part of the wheel which forms the
arch cone before spoken of and opposite the centre thereof. But as in
the usual thickness of the rim [illegible] such a tread the said ring would be
covered on the inside by only a thin shell of metal, I form such a bead
projection or thickness opposite thereto on the inside of the pattern of the
wheel as will cause the metal to cover it about three eighths of an inch
Iron founders are well acquainted with the means of supporting such
articles as the before described ring within the flask so that they may be
imbedded within the cast metal. The method which I have adopted of
effecting this in my wheels is the following. I take four strips of iron which
may be 1/8 of an inch thick 1/4 of an inch broad and 4 or 5 inches long
[illegible] one end of each of these I bend around the ring so as to clasp it tightly
the remainder of the strap forming a shank or bearing which rests upon
the sand in the lower flask. These clasps stand at equal distances apart
and when in the mould point towards the centre of the wheel. The
pattern must be so made that the parting of the sand in the flask will
be opposite to the centre of the ring. Facing sand of the usual description
should be used in making the mould. The ring before being placed in
the mould should have its surface made bright by filing or otherwise
It must also be heated say to the temperature of boiling water to
dissipate any moisture or other evaporable matter which might other
wise cause it to blow. The casting should be performed immediately
after placing the ring in the flask. Although I have described the mode
of procedure in casting and in other parts of the process for forming wheels
within which are imbedded a ring of wrought iron, I do not claim
these known as making any part of my invention but I do claim the
using a hoop or ring of wrought iron to be laid and cast within the
body of a rail road wheel in such manner as to operate as an internal
chill to cool more rapidly and consequently to harden the part which I have
described under the name of the arch or cone thereof. I claim no more.

Witnesses William Warfield
John C. Brown

Thomas Davis

[882 wv

[illegible]